G. E. SAPP.
VULCANIZING AIR BAG.
APPLICATION FILED OCT. 19, 1920.
1,380,930.
Patented June 7, 1921.
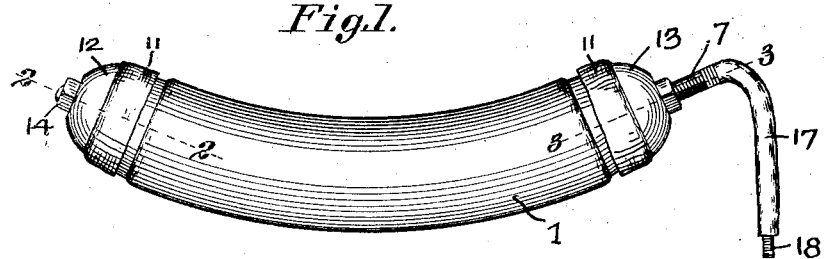
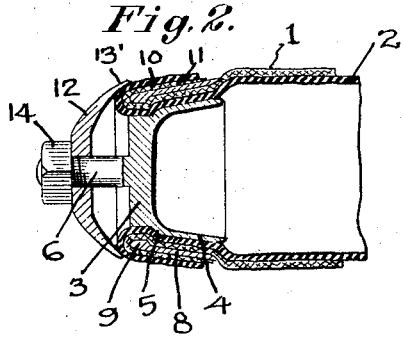
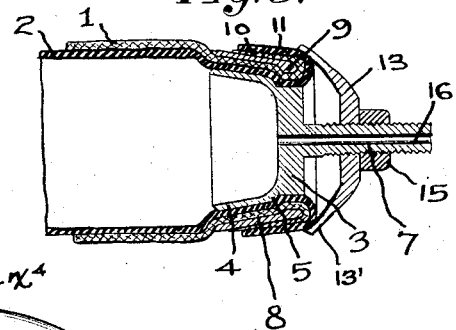
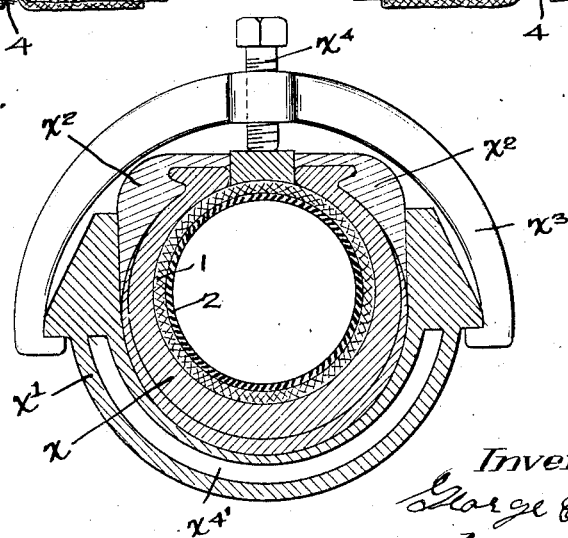
Inventor.
George E. Mary Sapp
By
Baldwin Vale
Attorney.

UNITED STATES PATENT OFFICE.

GEORGE EMORY SAPP, OF SACRAMENTO, CALIFORNIA.

VULCANIZING AIR-BAG.

1,380,930.  Specification of Letters Patent.  Patented June 7, 1921.

Application filed October 19, 1920. Serial No. 418,000½.

*To all whom it may concern:*

Be it known that I, GEORGE EMORY SAPP, a citizen of the United States, and a resident of the city of Sacramento, county of Sacramento, State of California, have made a new and useful invention—to wit, Improvements in Vulcanizing Air-Bags; and I do hereby declare the following to be a full, clear, concise, and exact description of the same.

This invention relates more particularly to air bags used in the process of vulcanizing sectional repairs in pneumatic tire casing.

Among the objects of the invention are to simplify and cheapen the first cost of such air bags. To so construct and arrange the parts of the air bag that its useful life will be prolonged. To so construct and arrange the metallic end seals that they will not crease or blemish the interior of the tire casing during the vulcanizing process. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one-sheet of drawings,

Figure 1 is a side elevation of a vulcanizing air bag constructed in accordance with this invention.

Fig. 2 is an enlarged detail view of one end thereof.

Fig. 3 is a similar view of the opposite end thereof.

Fig. 4 is an assembly view in cross-section illustrating the use of the air bag within an automobile tire casing locked up within a vulcanizing mold.

In detail the construction illustrated in the drawings referring to Figs. 2 and 3, the inner tube 2 may be a piece of the conventional inner tube as used in pneumatic tires, of a length equal to the total length of the fabric body 1. The inner tube 2 is inserted within the fabric body 1. Then the plugs 3 are inserted within the ends of the inner tube. These plugs have tapered body portions 4 with shoulder portions 5 and have the integral threaded necks or bolts 6 and 7 respectively. These plugs are inserted within the end of the bag about one inch within the end. The annular ferrules 8 are then inserted over the ends of the body portion 1. These ferrules are of metal and of substantially the same taper as the bodies 4—4 of the plugs. These ferrules are provided with the thickened and rounded ends 9, over which the ends 10 of the body portion and ends 11 of the inner tube are folded back to inclose the ferrules and retain the same securely within the ends of the air bag.

The substantially hemispherical end caps 12 and 13 are then inserted over the necks 6 and 7 until their peripheral portions 13' bear against the tube and compress it and the return fold portion of the body tube against the rounded ends 9 of the ferrules 4. When the nuts 14 and 15 are screwed on their respective necks 6 and 7 they force the inner tube and the folded ends of the air bag against the rounded ends 9 of the ferrules to form airtight joints, coöperating with the clamping or squeezing action between the bodies 4 of the plugs and the interior of the ferrules and forcing the shoulders 5 up against the thickened portions 9 of the ferrules, giving a large superficial area of pressure at the plugs against the interior surfaces of the ends of the inner tube to prevent air leakage and thus retain the air pressure within the inner tube.

The neck 7 is provided with a central bore 16 to which is attached a flexible hose connection 17 provided with the usual threaded valve end 18 having a check valve therein to hold any air pressure pumped therethrough.

This invention operates substantially as follows:

The pneumatic tire casing X is inserted within the vulcanizing mold $X^1$. The air bag is then inserted within the casing opposite the section thereof that is to be vulcanized. The molds $X^2$ are then assembled on the beads of the tire casing and the clamp $X^3$ applied to the vulcanizing mold and the clamping screw $X^4$ screwed down against the bead molds $X^2$, to form a retaining vulcanizing mold entirely around the diameter of the tire casing at the point to be vulcanized. The air bag is then pumped up to the desired pressure through the nipple 18 with the effect that the tire casing is forced to completely fill the inclosing tire mold. Steam heat is then applied through the chamber X⁴' and the "cure" is completed in accordance with conventional practice.

The conventional air bag having vulcanized ends, and constructed to retain air pressure without the use of an inner tube is capable of effecting from fifty to seventy-five one-hour "cures," such a bag costing from five to seven dollars, in accordance with size and present prices. By the use of this invention five hundred and seventy-five one-hour cures have been accomplished with a single body portion 1 and the inner tube of conventional construction has accomplished from nineteen to thirty-five one-hour cures. The efficiency, convenience and low cost contributed to the art by this invention are thereby manifest.

Having thus described this invention, what I claim and desire to secure by Letters Patent is:

1. An air bag comprising, a plug; a ferrule encircling said plug; a cap; a separable tube within said bag body, the ends of said bag and said tube being compressible between said plug, ferrule and cap.

2. An air bag comprising, a non-resilient plug having a threaded neck; a ferrule encircling said plug; a cap encircling said neck, and registering with said ferrule; a bag body; a separable tube within said body, the ends of said body and said tube being folded back over said ferrule; and a nut on said threaded neck.

3. An air bag comprising a substantially non-elastic body; an inner tube within said body; a ferrule surrounding the end of said bag and said tube; a non-resilient plug; a cap; and means for drawing said ferrule, plug and cap together to compress said ends of said bag and tube.

4. An air bag comprising a substantially non-elastic body; an inner tube within said body; a non-resilient plug having a threaded neck adapted to close an end of said inner tube; a ferrule encircling said plug and binding said bag and inner tube therebetween; and a cap in threaded engagement with said plug stem for compressing the ends of said inner tube and bag against said ferrule and means for locking said cap tightly in position.

5. An air bag comprising a substantially non-elastic body; an inner tube within said body; non-resilient plugs having threaded ends adapted to close the ends of said inner tubes; ferrules encircling said plugs for binding said bags and inner tubes therebetween; caps in threaded engagement with the opposite plug stems for compressing the ends of said inner tube and bag against said ferrules; lock nuts for holding said caps tightly on said stems and a hollow conduit extending through one of said plug stems for filling said inner tube.

In testimony whereof, I have hereunto set my hand at Sacramento, California, this 24th day of November, 1920.

GEORGE EMORY SAPP.